US012808648B2

(12) United States Patent
Floto et al.

(10) Patent No.: US 12,808,648 B2
(45) Date of Patent: Nov. 24, 2026

(54) HOISTWAY SURVEY TOOL FOR MEASURING A POSITION OF DROPLINES

(71) Applicant: OTIS ELEVATOR COMPANY, Farmington, CT (US)

(72) Inventors: Christopher Floto, Florence, SC (US); Paul Thomas Cornett, Florence, SC (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 302 days.

(21) Appl. No.: 18/766,866

(22) Filed: Jul. 9, 2024

(65) Prior Publication Data

US 2026/0016275 A1 Jan. 15, 2026

(51) Int. Cl.
*B66B 19/00* (2006.01)
*G01B 5/14* (2006.01)

(52) U.S. Cl.
CPC .............. *G01B 5/14* (2013.01); *B66B 19/002* (2013.01)

(58) Field of Classification Search
CPC .................................................... B66B 19/002
USPC .................................................... 33/613, 645
See application file for complete search history.

(56) References Cited

U.S. PATENT DOCUMENTS 6,435,315 B1 * 8/2002 Zaharia ................. B66B 1/3492 187/394
9,714,156 B2 * 7/2017 Valkama ............... B66B 5/0087
9,816,796 B2 * 11/2017 Wurth ....................... G01B 5/20
12,422,252 B2 * 9/2025 Martins .................. B66B 19/00

FOREIGN PATENT DOCUMENTS

EP 4678583 A1 * 1/2026 ............... G01B 5/14
WO WO-2011010991 A1 * 1/2011 ............. B66B 5/021

* cited by examiner

*Primary Examiner* — George B Bennett
(74) *Attorney, Agent, or Firm* — CANTOR COLBURN LLP

(57) ABSTRACT

A hoistway survey tool, having: a first longitudinal member; a platform coupled to the first member; a second member coupled to the second end of the first member, and has: a first leg; and a second leg that is normal to the first leg, the second member is configured to move toward and away from the first member, the second leg includes a first slot, a first slider in the first slot, and a first scale, and in operation the tool identifies a position of a first dropline in a hoistway relative to a first sidewall of the hoistway, when the bottom face of the platform is positioned on a landing floor at a ledge of a doorway, the first member is against a front wall of the hoistway, and the first slider is aligned with the first dropline.

20 Claims, 7 Drawing Sheets

HOISTWAY SURVEY TOOL FOR MEASURING A POSITION OF DROPLINES

BACKGROUND

The embodiments described herein relate to an elevator system and more specifically to a hoistway survey tool for measuring a position of droplines.

In a hoistway in which an elevator system will be installed, one or more wire droplines are installed at locations where elevator rails or other implements eventually will be installed. A location of the droplines may be checked by mechanics at each floor. Droplines are measured at each landing to make sure the rails are located correctly so that the elevator does not hit the landing once installed. Measuring a position of droplines may require the mechanic to lean into the otherwise mostly empty hoistway. This can lead to an unstable positioning of the mechanic.

BRIEF SUMMARY

Disclosed is a hoistway survey tool, including: a first member extending longitudinally along a first member axis from a first end to a second end; a platform, having a top face and a bottom face, slidably coupled to the first member and extending away from the first member along a platform surface axis; a second member, operationally coupled to the second end of the first member, and includes: a first leg extending along a first leg axis, from a third end to a first corner; and a second leg extending along a second leg axis that is normal to the first leg axis, from the first corner to a fourth end, wherein the second member is configured to move along the first leg axis, toward and away from the first member, wherein the second leg includes a first slot that extends along the second leg axis, a first slider in the first slot, and a first scale, and wherein the second member is configured for being in a first state where the first leg axis is parallel to the platform surface axis and normal to the first member axis, and the second leg axis is parallel to the first member axis and normal to the platform surface axis, and in operation the tool identifies a position of a first dropline in a hoistway relative to a first sidewall of the hoistway, when the bottom face of the platform is positioned on a landing floor at a ledge of a doorway, the first member is against a front wall of the hoistway, and the first slider is aligned with the first dropline.

In addition to one or more of the above aspects of the tool, or as an alternate, the second member has an L-shaped perimeter, and the first and second members together define a z-shape.

In addition to one or more of the above aspects of the tool, or as an alternate, the first slot is near the fourth end and the second member includes a second slot that extends along the second leg axis, wherein the second slot includes a second slider, and the first scale extends along the first and second slots.

In addition to one or more of the above aspects of the tool, or as an alternate, the second member is a plate having a top face and a bottom face; a third member is connected to the second end of the first member and extends along the first leg axis from an axial inner end at the second end of the first member to an axial outer end that is against the bottom face of the second member, wherein the second member is slidably connected to the third member so that the plate is configured to move along the second leg axis relative to the third member.

In addition to one or more of the above aspects of the tool, or as an alternate, the third member has at least two holes spaced apart from each other along the first leg axis, the first leg of the second member has third and fourth slots extending along the first leg axis, and each of the third and fourth slots includes a knurled knob bolt that extends into one of the holes, whereby the second member is configured to slide along the first leg axis relative to the third member and lock in-place against the third member.

In addition to one or more of the above aspects of the tool, or as an alternate, the first leg includes a second scale extending along the first leg axis, whereby, in operation, the tool is configured to further identify a position of a first dropline in the hoistway relative to a front wall of the hoistway, when the bottom face of the platform is positioned on the landing floor at the ledge of the doorway, the first member is against the front wall of the hoistway, and the first dropline is aligned with, and touches, one of the first or second sliders.

In addition to one or more of the above aspects of the tool, or as an alternate, each of the sliders has a top member disposed on the top face of the second member along the second leg and a bottom member disposed on the bottom face of the second member along the second leg; and the top and bottom members of the sliders both have a triangular shape with an apex that is directed along the first leg axis.

In addition to one or more of the above aspects of the tool, or as an alternate, for each of the sliders, one of the top and bottom members has connecting slots and another of the top and bottom members has legs that extend into the connecting slots, the legs are flexible and ends of the legs include outwardly extending bosses such that, when the legs are inserted into the connecting slots, the bosses are configured to securely lock the top and bottom members together.

In addition to one or more of the above aspects of the tool, or as an alternate, the third member is configured to pivot toward the first member for storage of the tool, whereby the second member is configured for being in a second state where the first leg axis is normal to the platform surface axis and parallel to the first member axis, and the second leg axis is normal to the first member axis and parallel to the platform surface axis.

In addition to one or more of the above aspects of the tool, or as an alternate, the first member is a square bar having a top, a bottom, a first side and a second side, and the third member is configured to pivot toward the first side; the platform includes a square channel that slides over the first member, wherein the square channel has a top, a bottom, a first side and a second side, that are respectively against the top, bottom and first and second sides of the first member; and the platform is connected to the second side of the square channel.

In addition to one or more of the above aspects of the tool, or as an alternate, wherein the tool includes bearings between the square channel and the first member.

In addition to one or more of the above aspects of the tool, or as an alternate, the platform is connected to the first corner of the square channel defined between the bottom and the second side of the square channel, and the platform includes a lip segment that extends away from the bottom face of the platform, along a lip-axis that is perpendicular to the first member axis and the platform surface axis, so that the platform has an L-shape, whereby: when the bottom face of the platform is positioned on the landing floor at the ledge of the doorway, the first, second and third members of the tool are within the hoistway and the second side of the square channel is against the front wall of the hoistway, and the tool is configured to identify the position of the first dropline in the hoistway relative to the front wall and the first sidewall of the hoistway; and when the top face of the platform is positioned on the landing floor at the ledge of the doorway, the first, second and third members of the tool are within the hoistway and the lip segment of the platform is against the front wall of the hoistway, and the tool is configured to identify a position of another dropline in the hoistway relative to the front wall and a second sidewall of the hoistway.

In addition to one or more of the above aspects of the tool, or as an alternate, the third member is a square bar.

In addition to one or more of the above aspects of the tool, or as an alternate, the second member is a clear polymer.

In addition to one or more of the above aspects of the tool, or as an alternate, the second end of the first member is connected to the third member via first and second brackets connected to the top and bottom faces of the first member.

In addition to one or more of the above aspects of the tool, or as an alternate, the axial inner end of the third member defines a first through-hole and the first and second brackets define a first pair of apertures located to align with the first through-hole when the third member is pivoted against the first member and a second pair of apertures located to align with the first through-hole when the third member is normal to the first member; and the tool includes a removable pin configured to be positioned through the first through-hole and the first pair of apertures when the third member is pivoted against the first member and through the first through-hole and the second pair of apertures when the third member is normal to the first member.

In addition to one or more of the above aspects of the tool, or as an alternate, the sliders are formed of a polymer.

In addition to one or more of the above aspects of the tool, or as an alternate, the scales on the second member is defined by an opaque surface with graduated markings.

In addition to one or more of the above aspects of the tool, or as an alternate, the first and third members are formed of aluminum.

Disclosed is a method of measuring a distance between front and sidewalls of the hoistway and droplines installed in the hoistway with the tool of having one or more of the above aspects, the method including: positioning the second member in the first state; positioning the bottom face of the platform on the landing floor at the ledge of the doorway so that the first, second and third members of the tool are within the hoistway and the second side of the square channel is against the front wall of the hoistway; adjusting the sliders, the position of the second member against the third member, and the first member relative to the platform, to measure a position of the first dropline relative to the first sidewall and the front wall; flipping the tool so that the top face of the platform is positioned on the landing floor at the ledge of the doorway, and so that the first, second and third members of the tool are within the hoistway and the lip segment of the platform is against the front wall of the hoistway; and adjusting of the sliders, the position of the second member against the third member, and the first member relative to the platform, to measure the position of the another dropline relative to the second sidewall and the front wall.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
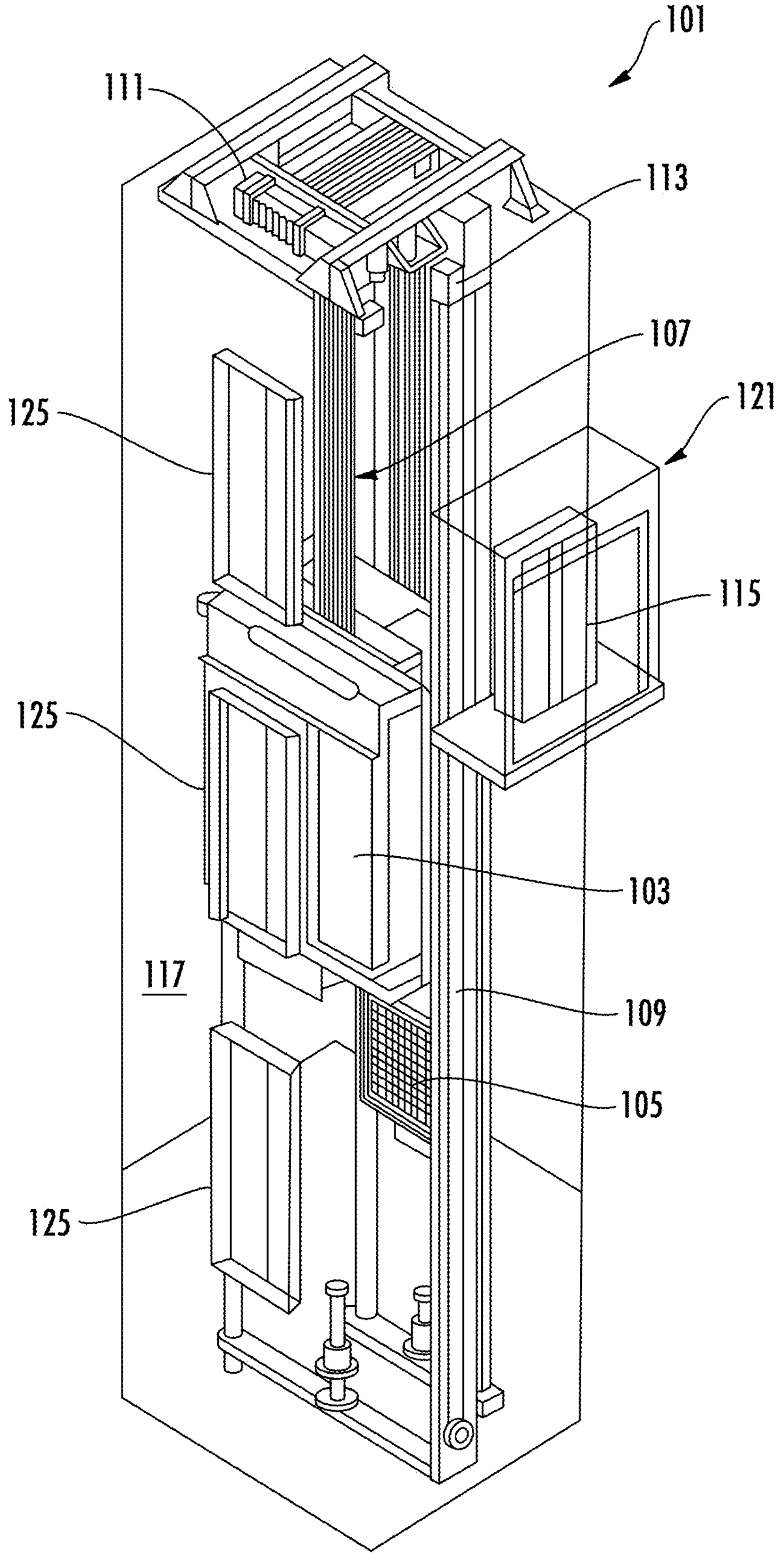
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 may be located, as shown, in a controller room 121 of the elevator shaft 117 and is configured to control the operation of the elevator system 101, and particularly the elevator car 103. It is to be appreciated that the controller 115 need not be in the controller room 121 but may be in the hoistway or other location in the elevator system. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within a hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 3:
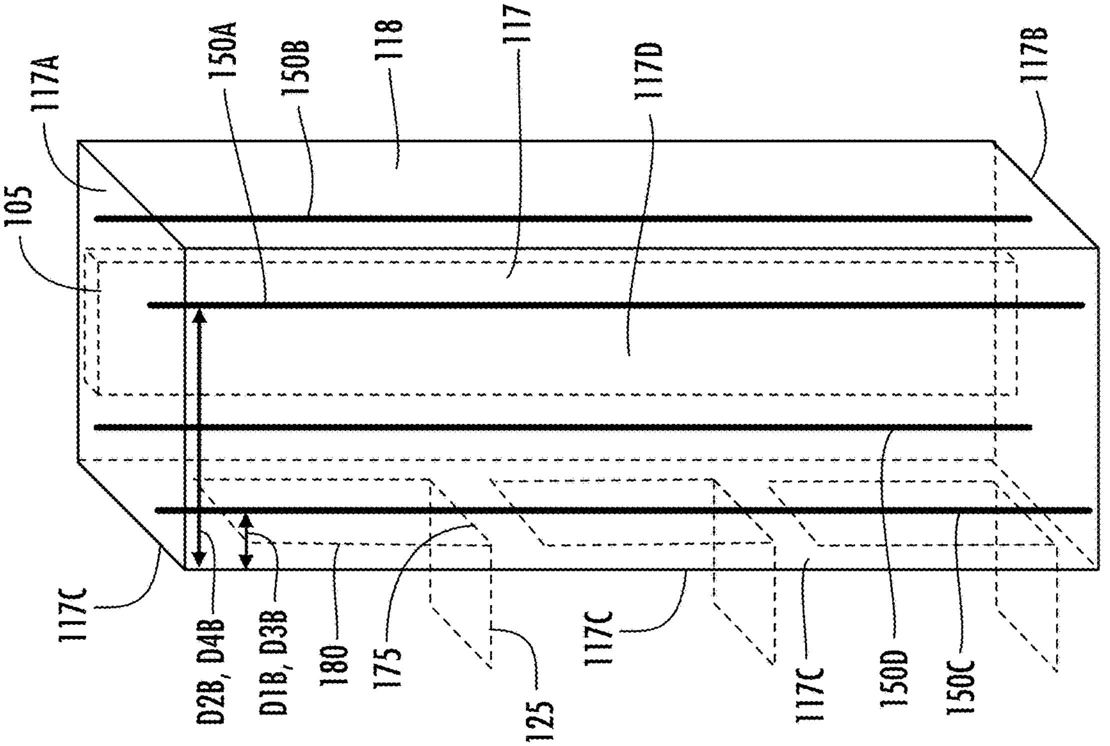
FIG. 3 shows a side view of the hoistway.
Figure 2:
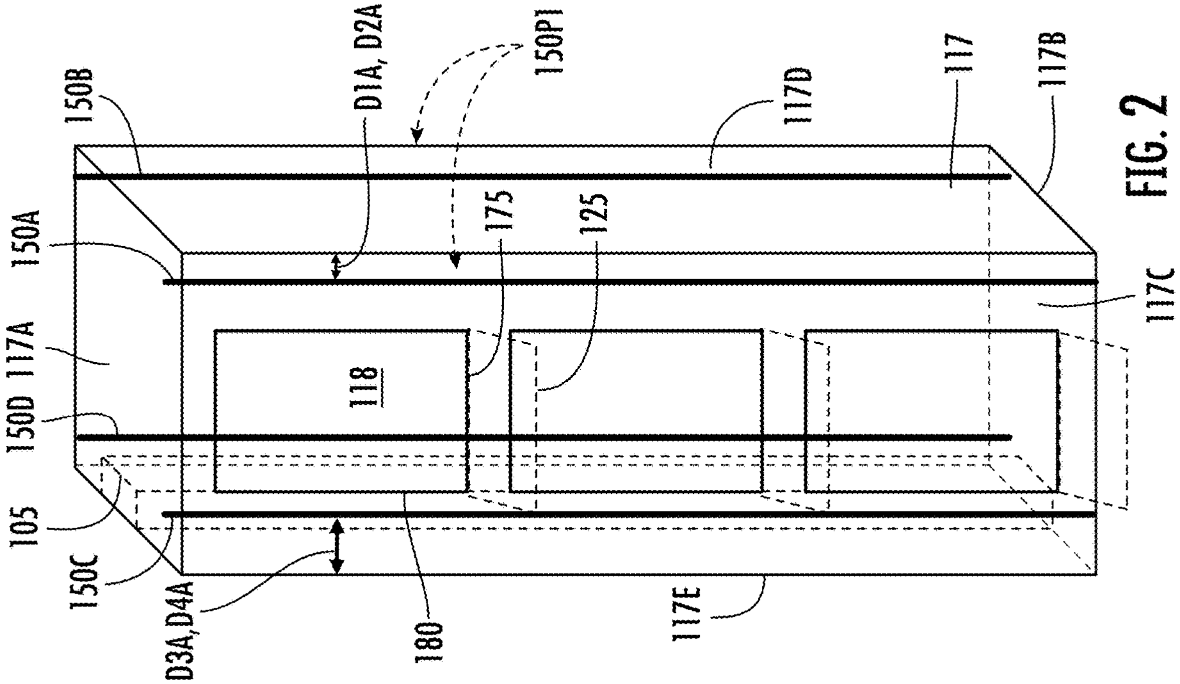
FIG. 2 shows a front view of a hoistway in which droplines have been installed in preparation of installation of the elevator system.

Turning to FIGS. 2 and 3, when preparing the hoistway 117 to install the elevator system 101 (FIG. 1), a least one dropline 150 is installed as a guide for installing, e.g., a rail 109 (FIG. 1) or other implement. As a non-limiting implementation, four droplines 150A-150D are shown in FIGS. 2 and 3 and utilized to install the rails 109. Of the four droplines, two droplines (e.g., organized as pairs, i.e., first and second pairs 150P1, 150P2) are located on either side of the doorway openings 180, extending from the top 117A to the bottom 117B of the hoistway 117. The droplines are setback from the ledge 175 of the doorway openings 180 such that in the first dropline pair 150P1 one line 150A is near forward wall 117C and the first sidewall 117D, and one line 150B is near the aft wall 118 of the hoistway and the first sidewall 117D. In the second dropline pair 150P2 one line 150C is near the forward wall 117C and the second sidewall 117E, and one line 150D is near the aft wall 118 and the second sidewall 117E.

The droplines are dropped by a machine (not shown) such that the placement of each line in a pair 150P1, 150P2 is known relative to each other. That is, it is known that if the first line 150A, 150C in each pair 150P1, 150P2 is in the correct location, then the section line 150B, 150D in each pair 150P1, 150P2 will be in the correct location.

To confirm the droplines 150 are in the correct locations, at each of the levels 125 in the building a user may measure a distance, generally between the front droplines 150A, 150C and the front wall 117C of the hoistway as well as the adjacent first and second (left and right) sidewalls 117D, 117E of the hoistway 117. For example, the first dropline 150A may have a distance D1A to the first sidewall 117D and a distance DIB to the front wall 117C. The second dropline 150B may have a distance D2A to the first sidewall 117D and a distance D2B to the front wall 117C, which is confirmed by measuring the placement of the first dropline 150A. The third dropline 150C may have a distance D3A to the second sidewall 117E and a distance D3B to the front wall 117C. The fourth dropline 150D may have a distance D4A to the second sidewall 117E and a distance D4B to the front wall 117C, which is confirmed by measuring the placement of the third dropline 150C.

In practice, the front lines (one in each pair 150P1, 150P2) have a same distance to the front wall 117C and the back lines have the same distance as each other to the back wall 118. The counterweight can be located on either the left or right side depending on the desired hoistway configuration. The pair on the counterweight side will be further from the adjacent sidewall. That is, the third and fourth droplines should be the same distance as the first and second to the front wall. The third and fourth droplines may be further from the sidewall such that D3A and D4A are greater than D1A and D2A. The goal is for D1A and D2A to be the same as each other while D1B and D2B will be different from each other. Similarly, the goal is for D3A and D4A to be the same as each other while D3B and D4B will be different from each other. As indicated, the relative locations of the rear droplines (or wires) 150B, 150D will be known by confirming the locations of the front lines 150A, 150C.

Turning to FIG. 4, to a tool 200 is shown for measuring the position of the front droplines 150A, 150C relative to the front and sidewalls 117. The tool 200 includes a first member 210 extending longitudinally along a first member axis A1 from a first end 220 to a second end 230. The tool 200 includes a platform 240 having a top face 250 and a bottom face 260. The platform 240 is slidably coupled to the first member 210 and extends perpendicularly away from the first member 210 along a platform surface axis A2.

The tool 200 includes a second member 270, operationally coupled to the second end 230 of the first member 210. The second member 270 includes a first leg 280 extending along a first leg axis LA1, from a third end 290 to a first corner 300. The second member 270 includes a second leg 310 extending away from the first member 210 along a second leg axis LA2 that is normal to the first leg axis LA1, from the first corner 300 to a fourth end 320. It is to be appreciated that elements 280 (leg), 320 (end) and 310 (leg) are all elements of the same (second) member 270. That is, they are elements of a unitary structure. The sliders 340 (discussed below) are the only movable elements relative to the second member 270, along the LA2 axis (discussed below).

The second member 270 is configured to move along the first leg axis LA1. That is the second member 270 is configured to move toward and away from the second end 230 of the first member 210, The second leg 310 of the second member 270 includes a first slot 330 that extends along the second leg axis LA2. A first slider 340 (otherwise known as a marker or locator) is in the first slot 330, and a first scale 350 extends along an outer edge 310A of the second member 270.

In one embodiment, the first slot 330 is near the fourth end 320 of the second member 270. The second member 270 includes a second slot 360 that extends along the second leg axis LA2. As shown, the slots 330, 360 are colinear along the second leg axis LA2, and the second slot 360 is adjacent to the first slot 330, though this configuration is not intended on limiting the configuration options for the slots 330, 360, which, e.g., may be disposed at an angle to each other. The second slot 360 includes a second slider 370, and the first scale 350 extends along the first and second slots 360. The second slider 370 is used to measure the position of the third line relative to its sidewall. The second slider 370 in its slot 360 is further from the fourth end 320 of the tool 200 than the first slider 340 in its slot 330 because the first line is closer to its sidewall than the third line 150C because the third line 150C has to clear the counterweight 105 (see FIGS. 8A and 8B).

The second member 270 is configured for being in a first state shown in dashed lines in FIG. 4. In the first state, the first leg axis LA1 is parallel to the platform surface axis A2 and normal to the first member axis A1, and the second leg axis LA2 is parallel to the first member axis A1 and normal to the platform axis A2.

As seen in FIG. 4, the second member 270 has an L-shaped perimeter and more specifically an outer perimeter edge 275. The first and second members together define a z-shape when the second member 270 is in the first state.

Figure 4A:
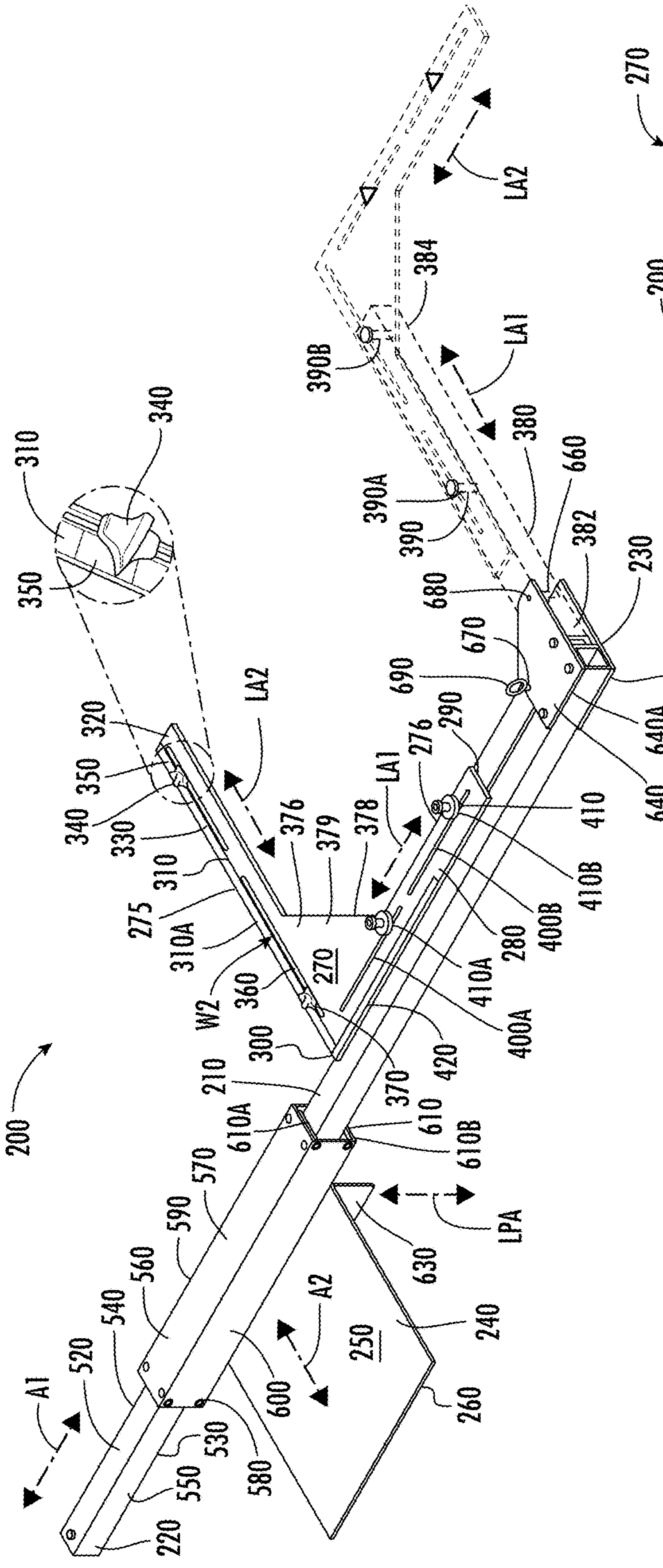
FIG. 4A shows a hoistway survey tool for measuring a position of the droplines.
Figure 4B:
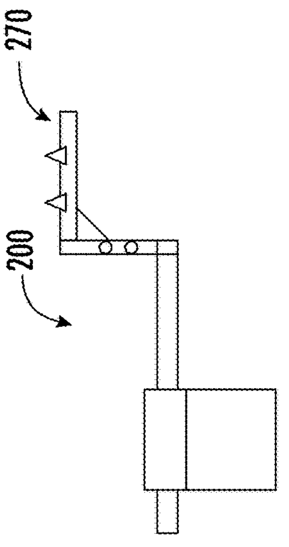
FIG. 4B shows the hoistway survey tool with a second member closer to a first member, depending on a hoistway configuration.
Figure 4C:
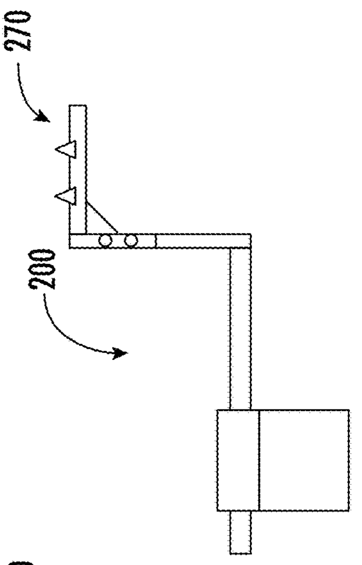
FIG. 4C shows a hoistway survey tool with a second member further from a first member, depending on a hoistway configuration.
Figure 5A:
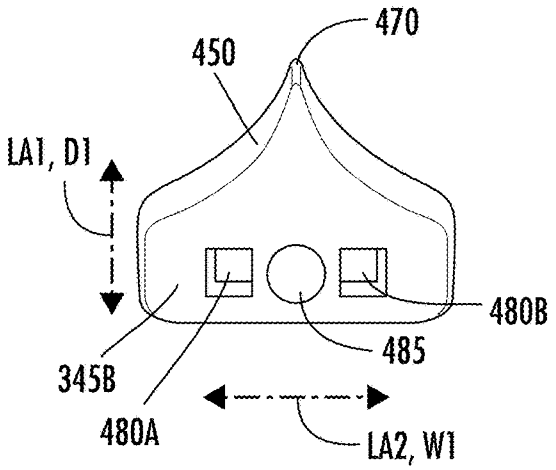
FIG. 5A is a bottom view of a first member of a slide marker utilized with the survey tool.
Figure 5B:
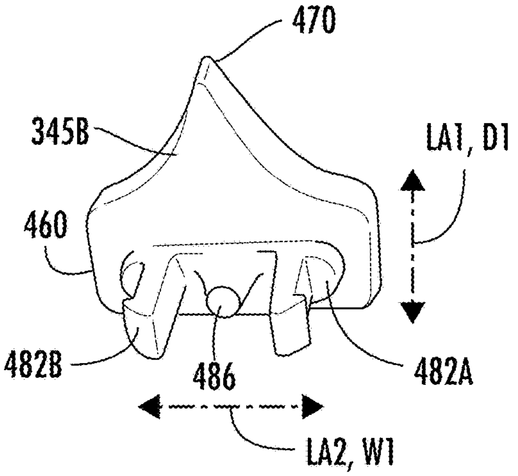
FIG. 5B is a bottom view of a second member of a slide marker utilized with the survey tool.
Figure 6A:
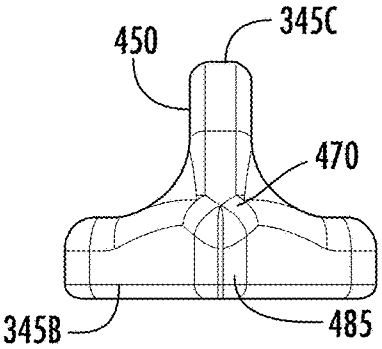
FIG. 6A is a front view of the first member of a slide marker utilized with the survey tool.
Figure 6B:
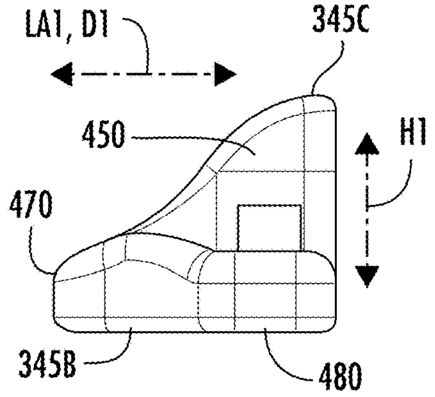
FIG. 6B is a side view of the first member of a slide marker utilized with the survey tool.
Figure 7A:
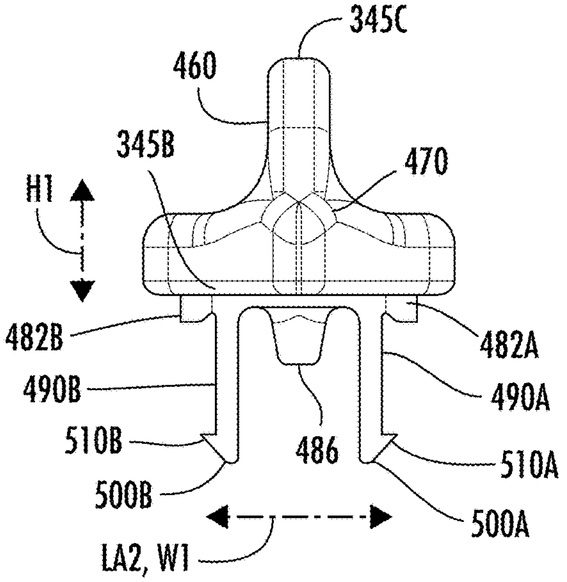
FIG. 7A is a front view of the second member of a slide marker utilized with the survey tool.
Figure 7B:
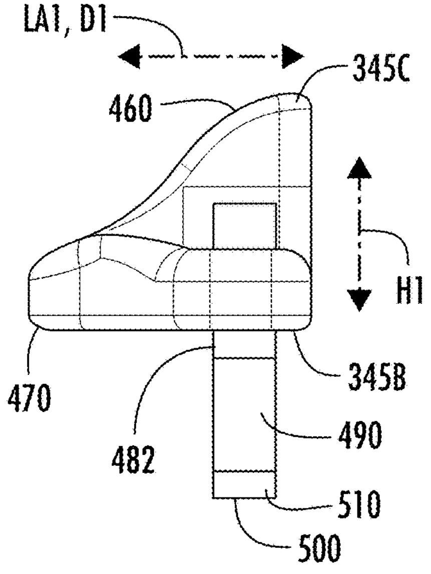
FIG. 7B is a side view of the second member of a slide marker utilized with the survey tool.

As shown in FIG. 4A, the second member 270 is a plate having a top face 376 and a bottom face 378. The second member 270 defines a cross-member segment 379 along the inner perimeter edge 276 of the second member 270, between the first and second legs 280, 310 that is triangularly shaped to provide stiffness and support, e.g., to the second leg 310.

A third member 380 is connected to the second end 230 of the first member 210 and extends along the first leg axis LA1 from an axial inner end 382 at the second end 230 of the first member 210 to an axial outer end 384 that is against the bottom face 378 of the second member 270. The second member 270 is slidably connected to the third member 380 so that the second member is configured to move along the first leg axis LA1 relative to the third member 380. This movement is to accommodate different positioning of the front droplines relative to the front hoistway wall in different hoistways. In some instances, the second member 270 will be closer to the first member 210 (FIG. 4B) and in some instances it will be further from the first member 210 (FIG. 4C), and in each instance that adjustment is made between the second and third members 270, 380. However, for any particular hoistway, the position of the second member 270 relative to the first member 210 is fixed.

To move the second member 270 relative to the third member 380, the third member 380 has at least two holes 390A, 390B (generally 390) spaced apart from each other along the first leg axis LA1. The first leg 280 of the second member 270 has third and fourth slots 400A, 400B (generally 400) extending along the first leg axis LA1. The slots 400 are collinear with each other and adjacent to each other along the first leg axis LA1 so that the third slot 400A is closer to the first corner 300. Each of the third and fourth slots 400 includes a knurled-knob bolt 410A, 410B (i.e., first and second bolts 410A, 410B, generally referenced as 410) that extends into one of the threaded holes 390. The knobs may be threaded to enable fixing the location of the knurled-knob bolts 410A, 410B. From this configuration, the second member 270 is configured to slide along the first leg axis LA1 relative to the third member 380 and lock in-place against the third member 380.

In one embodiment, the first leg 280 includes a second scale 420 extending along the first leg axis LA1. Both scales 350, 420 are along the outer perimeter edge 275 of the second member 270.

Turning to FIGS. 5A, 5B, 6A, 6B, 7A and 7B, each of the sliders 340, 370 has a top (for first) member 450 disposed on the top face 386 of the second member 270 along the second leg 310 and a bottom (or second) member 460 disposed against the bottom face 388 of the second member 270, i.e., along the second leg 310. The top and bottom members 450, 460 of the sliders 340, 370 both have a triangular shape with an apex 470, that is directed along the first leg axis LA1, which is a depth direction D1 for the sliders 340, 370.

The members 450, 460 of the sliders 340, 370 have top and bottom surfaces 345A, 345B. The bottom surface 345B may be generally planar and the top surface 345A may be shaped the same as each other and may be arcuate and shaped with a top peak 345C for gripping by a user. This way, from the top or bottom of the tool 200, the sliders have the same appearance and usability by the user.

For each of the sliders 340, 370, one of the top and bottom members 450, 460 has first and second connecting slots 480A, 480B (generally 480) extending along a height direction H1 for the sliders 340, 370 and spaced apart from each other along the second leg axis LA2, which is the width direction W1 for the sliders 340, 370. Another of the top and bottom members has first and second legs 490A, 490B (generally 490) having a complementary position relative to the slots 480 extend from the bottom surface 345B and into the connecting slots 480. The legs 490 are flexible and ends 500 of the legs include outwardly extending first and second bosses 510A, 510B (generally 510). When the legs 490 are inserted into the connecting slots 480, the bosses 510 securely lock the top and bottom members together 450, 460. The slots 480 have a width W2 (FIG. 4), e.g., along the first leg axis LA1, and the legs 490 have a depth in the same direction that is sized to allow for a slip fit in the slots 480. This enables the sliders 340, 370 to slide while preventing rotation of the sliders in the slots 480. First and second stub protrusions 482A, 482B (generally 482) extend below the bottom surface 345B of the slider formed with the legs 490 and are widthwise outside the legs 490 to provide additional rotation resistance for the sliders 340, 370 in the slots 480

A center aperture 485 may be defined in the height direction of the one of the top and bottom members 450, 460, extending from a bottom surface 345B, between the slots 480, that as indicated, extend in the same direction. A center boss 486 may extend along the height direction of the other one of the top and bottom members 450, 460, extending from the bottom surface 345B, widthwise between the legs 490 that, as indicated, extend in the same direction. The boss 486 fits into the aperture 485 to provide additional stability in the slots 480. The boss 486 may be cylindrical or cone shaped, narrowing away from the bottom surface 345B of the of the other one of the top and bottom members 450, 460. The aperture 485 may have a complementary shape and may be sized to provide a friction fit.

Turning back to FIG. 4A, in one embodiment, the third member 380 is configured to pivot toward the first member 210 for storage of the tool 200. From this, the second member 270 is configured for being in a second state where the first leg axis LA1 is normal to the platform surface axis A2 and parallel to the first member axis A1. At the same time, the second leg axis LA2 is normal to the first member axis A1 and parallel to the platform axis A2.

In one embodiment, the first member 210 is a square bar having a top 520, a bottom 530, a first side 540 and a second side 550. The third member 380 is configured to pivot toward the first side 540. The platform 240 includes a square channel 560 that slides over the first member 210. The square channel 560 has a top 570, a bottom 580, a first side 590 and a second side 600, that are respectively against the top 520, bottom 530 and the first and second sides 540, 550 of the first member 210. The platform 240 is connected to the second side 600 of the square channel 560. First and second bearings 610A, 610B (generally 610) are between the first member 210 and the square channel 560 and enable sliding motion of the platform 240 relative to the first member 210. As shown the bearings are between the top and bottom sides of the first member 210 and the square channel 560, though this is not intended on limiting the location of the bearings 610. There are also bearings on the left and right sides of member 210.

In one embodiment, the platform 240 is connected to a first corner 620 of the square channel 560 defined between the bottom 580 and the second side 600 of the square channel 560. The platform 240 includes a lip segment 630 that extends away from the bottom face 260 of the platform 240, along a lip-axis LPA that is perpendicular to the first member axis A1 and the platform surface axis A2. As shown in FIG. 4, the platform 240 has an L-shape throughout its span along the first member axis A1.

In one embodiment, the second end 230 of the first member 210 is connected to the third member 380 via first and second brackets 640A, 640B (generally 640). The brackets 640 are connected to the top and bottom faces 520, 530 of the first member 210.

The axial inner end 382 of the third member 380 defines a first through-hole 660. The first and second brackets 640 define a first pair of apertures 670 located to align with the first through-hole 660 when the third member 380 is pivoted against the first member 210, i.e., in the second state. The first and second brackets 640 define a second pair of apertures 680 located to align with the first through-hole 660 when the third member 380 is normal to the first member 210, i.e., in the first state.

The tool 200 includes a removable pin 690 configured to be positioned through the first through-hole 660 and the first pair of apertures 670 when the third member 380 is pivoted against the first member 210. The removable pin 690 is configured to be positioned through the first through-hole 660 and the second pair of apertures 680 when the third member 380 is normal to the first member 210.

In one embodiment, the platform 240 may be eighteen inches square, the first member 210 may be sixty inches long, and the first and second legs 280, 310 of the second member 270 may be twenty one inches long. The third member 380 may be sized to provide a range of movement for the outer edge of the second leg 310 of two to three feet relative to the connected end 230 of the first member 210. These dimensions are for example only and not intended on limiting the scope of the embodiments.

In one embodiment, the third member 380 is a square bar. In one embodiment the first and third members are formed of aluminum. In one embodiment, the second member 270 is a clear polymer. In one embodiment, the scales on the second member 270 are defined by an opaque surface with graduated markings. In one embodiment, the sliders 340, 370 are formed of a polymer.

Figure 8A:
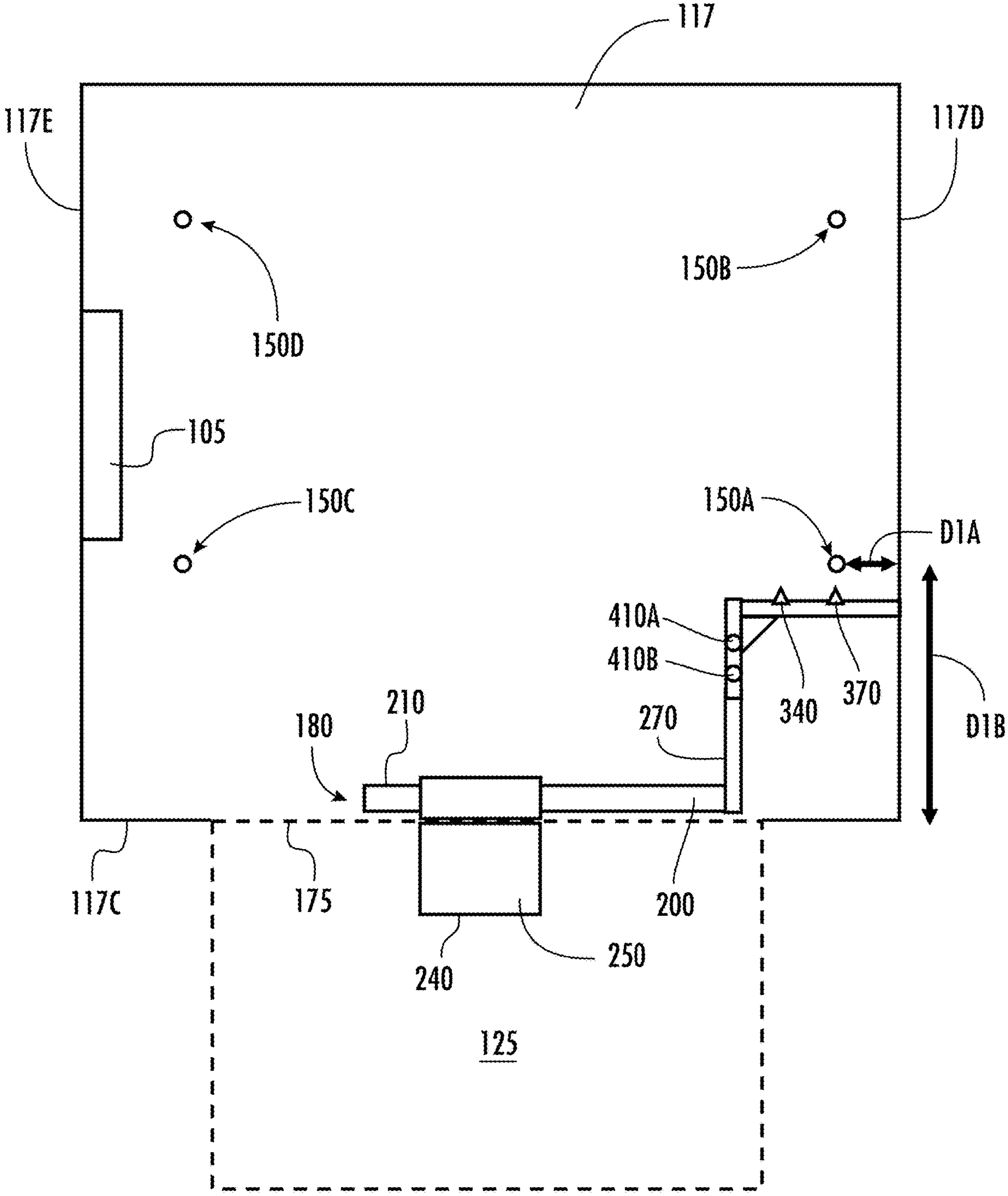
FIG. 8A shows the tool utilized to measure a position of droplines on a right side of a hoistway.

As shown in FIG. 8A, with this configuration, the bottom face 260 of the platform 240 may be positioned on the landing floor 125 at the ledge 175 of the doorway 180 (the top face 250 is visible in the top view of FIG. 8A). At the same time, the first, second and third members of the tool 200 are within the hoistway 117 and the second side 600 of the square channel 560 (FIG. 4) is against the front wall 117C of the hoistway 117. The tool 200 is configured to identify the position of the first dropline 150A in the hoistway 117 relative to the front wall 117C and the first sidewall 117D of the hoistway 117. That is, the tool is configured to measure D1A and D1B, e.g., of the first droplines 150A. Adjusting of the sliders 340, 370, the position of the second member 270 against the third member 380, and the first member 210 relative to the platform 240, may be required to obtain this measurement. Further, the second member 270 is in the first state to obtain this measurement. The position of the second member 270 is adjusted against the third member 380 via loosening the bolts 410A, 410B, moving the second member 270 toward or away from the first member 210 and then tightening the bolts 410A, 410B.

Figure 8B:
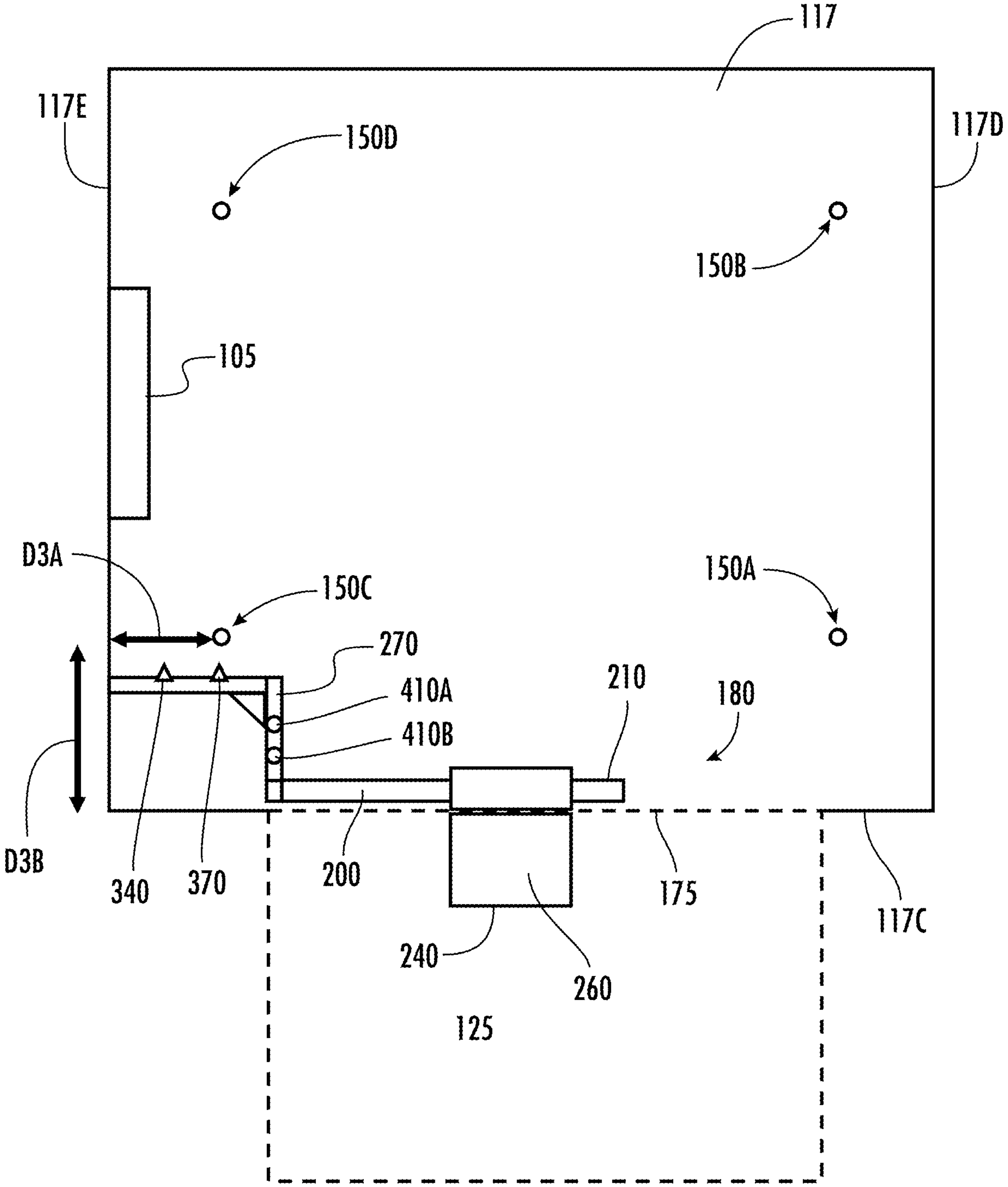
FIG. 8B shows the tool utilized to measure a position of droplines on a left side of a hoistway.

As shown in FIG. 8B, the tool 200 may be flipped to measure similar positioning of the third dropline 150C (i.e., measuring the position of another dropline after measuring the position of the first dropline). That is, the top face 250 of the platform 240 is positioned on the landing floor 125 at the ledge of the doorway 180 (the bottom face 260 is visible in the top view of FIG. 8B). At the same time, the first, second and third members of the tool 200 are within the hoistway 117 and the lip segment 630 (FIG. 4) of the platform 240 is against the front wall 117C of the hoistway 117. In this position, the tool 200 is configured to identify the position of third dropline 150C, in the hoistway relative to the front wall 117C and the second sidewall 117E of the hoistway 117. That is, the tool is configured to measure D3A and D3B, e.g., of the third dropline 150C. As indicated, adjusting of the sliders 340, 370, the position of the second member 270 against the third member 380, and the first member 210 relative to the platform 240, may be required to obtain this measurement. Further, the second member 270 is in the first state to obtain this measurement. The position of the second member 270 is adjusted against the third member 380 via loosening the bolts 410A, 410B, moving the second member 270 toward or away from the first member 210 and then tightening the bolts 410A, 410B. For illustration purposes, in FIGS. 8A and 8B, the drop lines are closer to the front wall in FIG. 8B than in FIG. 8A and the second member 270 of the tool is adjusted against the third member 380 accordingly. It is to be appreciated that in a typical installation, when flipping the tool between measuring the drop lines near one sidewall and the other sidewall, the droplines will have a same distance to the front wall. That is, such adjustment of the second member 270 should not be required when measuring the front drop lines on either side of the ledge 175.

Figure 9:
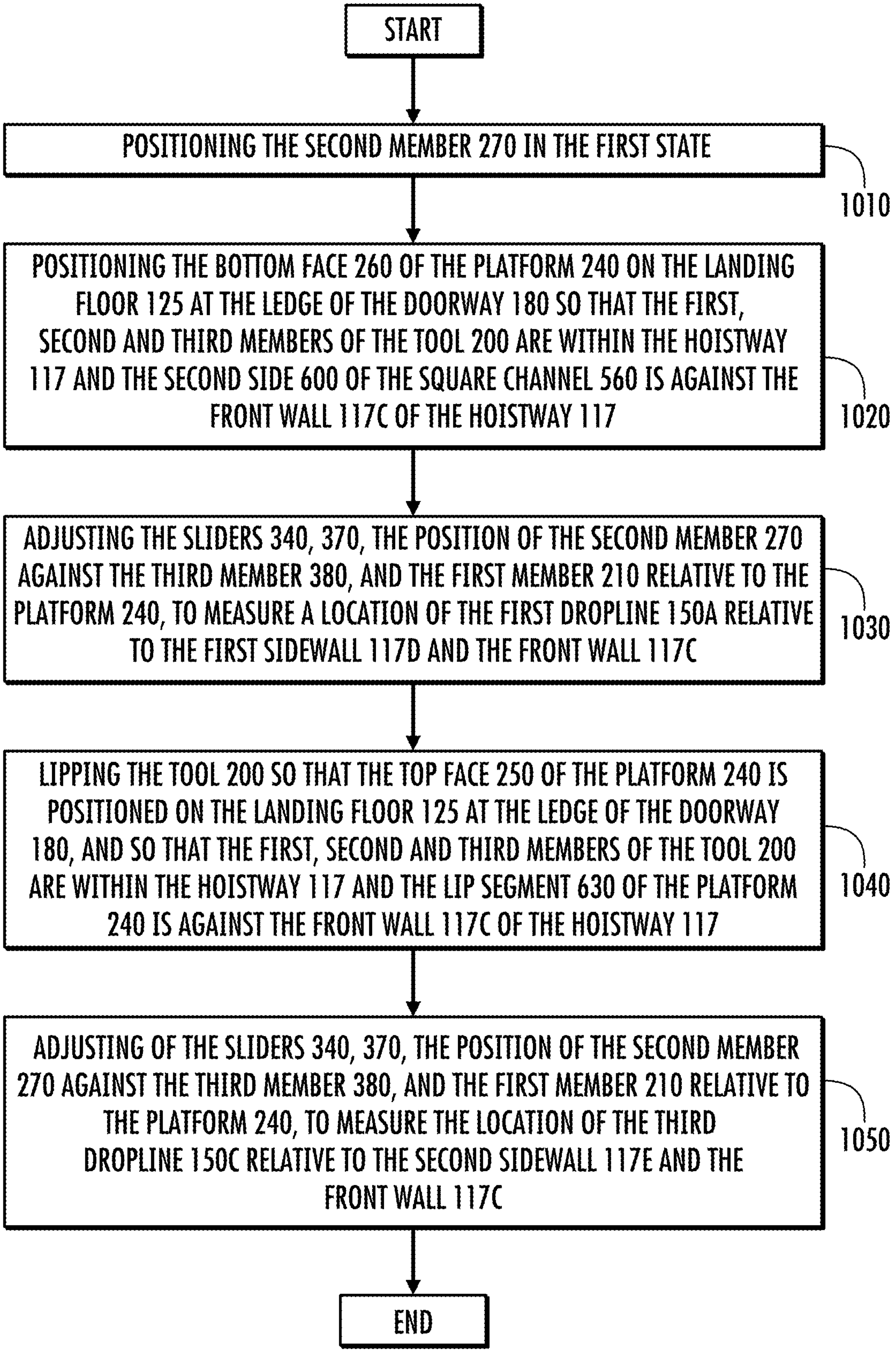
FIG. 9 is a flowchart showing a method of measuring a position of droplines with the tool of FIG. 4.

Turning to FIG. 9, a flowchart shows a method of measuring a location of the droplines 150 in the hoistway 117. As shown in block 1010, the method includes positioning the second member 270 in the first state. As shown in block 1020, the method includes positioning the bottom face 260 of the platform 240 on the landing floor 125 at the ledge of the doorway 180 so that the first, second and third members of the tool 200 are within the hoistway 117 and the second side 600 of the square channel 560 is against the front wall 117C of the hoistway 117. As shown in block 1030 the method includes adjusting the sliders 340, 370, the position of the second member 270 against the third member 380, and the first member 210 relative to the platform 240, to measure a location of the first dropline 150A relative to the first sidewall 117D and the front wall 117C.

As shown in block 1040, the method includes flipping the tool 200 so that the top face 250 of the platform 240 is positioned on the landing floor 125 at the ledge of the doorway 180, and so that the first, second and third members of the tool 200 are within the hoistway 117 and the lip segment 630 of the platform 240 is against the front wall 117C of the hoistway 117. As shown in block 1050 the method includes adjusting of the sliders 340, 370, the position of the second member 270 against the third member 380, and the first member 210 relative to the platform 240, to measure the location of the third droplines 150C (e.g., the another dropline) relative to the second sidewall 117E and the front wall 117C.

It is to be appreciated that in an elevator hoistway with both front and rear entries, the back lines, near the back wall, may also be measured or measured instead of the front lines.

The embodiments provide a hoistway survey tool. The tool reaches into the hoistway and is able to be positioned closer to the droplines than a user (e.g., a mechanic). The user can kneel on the tool on the side of the hoistway and slide it over to measure droplines on either side without needing to lean over the hoistway. The tool allows the user to measure from the droplines to the front and side of the hoistway, simultaneously. As compared with a process in which a user leans into the hoistway to check the droplines, the disclosed tool optimizes survey time at each landing, is safer, and provides a more accurate measurement.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

What is claimed is:

1. A hoistway survey tool, comprising:

a first member extending longitudinally along a first member axis from a first end to a second end;

a platform, having a top face and a bottom face, slidably coupled to the first member and extending away from the first member along a platform surface axis;

a second member, operationally coupled to the second end of the first member, and includes: a first leg extending along a first leg axis, from a third end to a first corner; and a second leg extending along a second leg axis that is normal to the first leg axis, from the first corner to a fourth end, wherein the second member is configured to move along the first leg axis, toward and away from the first member, wherein the second leg includes a first slot that extends along the second leg axis, a first slider in the first slot, and a first scale, and wherein the second member is configured for being in a first state where the first leg axis is parallel to the platform surface axis and normal to the first member axis, and the second leg axis is parallel to the first member axis and normal to the platform surface axis, and in operation the tool identifies a position of a first dropline in a hoistway relative to a first sidewall of the hoistway, when the bottom face of the platform is positioned on a landing floor at a ledge of a doorway, the first member is against a front wall of the hoistway, and the first slider is aligned with the first dropline.

2. The tool of claim 1, wherein the second member has an L-shaped perimeter, and the first and second members together define a z-shape.

3. The tool of claim 1, wherein the first slot is near the fourth end and the second member includes a second slot that extends along the second leg axis, wherein the second slot includes a second slider, and the first scale extends along the first and second slots.

4. The tool of claim 3, wherein:

the second member is a plate having a top face and a bottom face;

a third member is connected to the second end of the first member and extends along the first leg axis from an axial inner end at the second end of the first member to an axial outer end that is against the bottom face of the second member, wherein the second member is slidably connected to the third member so that the plate is configured to move along the second leg axis relative to the third member.

5. The tool of claim 4, wherein:

the third member has at least two holes spaced apart from each other along the first leg axis, the first leg of the second member has third and fourth slots extending along the first leg axis, and each of the third and fourth slots includes a knurled knob bolt that extends into one of the holes, whereby the second member is configured to slide along the first leg axis relative to the third member and lock in-place against the third member.

6. The tool of claim 5, wherein the first leg includes a second scale extending along the first leg axis, whereby, in operation, the tool is configured to further identify a position of a first dropline in the hoistway relative to a front wall of the hoistway, when the bottom face of the platform is positioned on the landing floor at the ledge of the doorway, the first member is against the front wall of the hoistway, and the first dropline is aligned with, and touches, one of the first or second sliders.

7. The tool of claim 6, wherein:

each of the sliders has a top member disposed on the top face of the second member along the second leg and a bottom member disposed on the bottom face of the second member along the second leg; and the top and bottom members of the sliders both have a triangular shape with an apex that is directed along the first leg axis.

8. The tool of claim 7, wherein for each of the sliders, one of the top and bottom members has connecting slots and another of the top and bottom members has legs that extend into the connecting slots, the legs are flexible and ends of the legs include outwardly extending bosses such that, when the legs are inserted into the connecting slots, the bosses are configured to securely lock the top and bottom members together.

9. The tool of claim 8, wherein the third member is configured to pivot toward the first member for storage of the tool, whereby the second member is configured for being in a second state where the first leg axis is normal to the platform surface axis and parallel to the first member axis, and the second leg axis is normal to the first member axis and parallel to the platform surface axis.

10. The tool of claim 9, wherein:

the first member is a square bar having a top, a bottom, a first side and a second side, and the third member is configured to pivot toward the first side;

the platform includes a square channel that slides over the first member, wherein the square channel has a top, a bottom, a first side and a second side, that are respectively against the top, bottom and first and second sides of the first member; and the platform is connected to the second side of the square channel.

11. The tool of claim 10, including bearings between the square channel and the first member.

12. The tool of claim 10, wherein the platform is connected to the first corner of the square channel defined between the bottom and the second side of the square channel, and the platform includes a lip segment that extends away from the bottom face of the platform, along a lip-axis that is perpendicular to the first member axis and the platform surface axis, so that the platform has an L-shape, whereby:

when the bottom face of the platform is positioned on the landing floor at the ledge of the doorway, the first, second and third members of the tool are within the hoistway and the second side of the square channel is against the front wall of the hoistway, and the tool is configured to identify the position of the first dropline in the hoistway relative to the front wall and the first sidewall of the hoistway; and when the top face of the platform is positioned on the landing floor at the ledge of the doorway, the first, second and third members of the tool are within the hoistway and the lip segment of the platform is against the front wall of the hoistway, and the tool is configured to identify a position of another dropline in the hoistway relative to the front wall and a second sidewall of the hoistway.

13. The tool of claim 10, wherein the third member is a square bar.

14. The tool of claim 1, wherein the second member is a clear polymer.

15. The tool of claim 10, where the second end of the first member is connected to the third member via first and second brackets connected to the top and bottom faces of the first member.

16. The tool of claim 15, wherein:

the axial inner end of the third member defines a first through-hole and the first and second brackets define a first pair of apertures located to align with the first through-hole when the third member is pivoted against the first member and a second pair of apertures located to align with the first through-hole when the third member is normal to the first member; and the tool includes a removable pin configured to be positioned through the first through-hole and the first pair of apertures when the third member is pivoted against the first member and through the first through-hole and the second pair of apertures when the third member is normal to the first member.

17. The tool of claim 10, wherein the sliders are formed of a polymer.

18. The tool of claim 10, wherein the scales on the second member is defined by an opaque surface with graduated markings.

19. The tool of claim 10, wherein the first and third members are formed of aluminum.

20. A method of measuring a distance between front and sidewalls of the hoistway and droplines installed in the hoistway with the tool of claim 12, the method comprising:

positioning the second member in the first state;

positioning the bottom face of the platform on the landing floor at the ledge of the doorway so that the first, second and third members of the tool are within the hoistway and the second side of the square channel is against the front wall of the hoistway;

adjusting the sliders, the position of the second member against the third member, and the first member relative to the platform, to measure a position of the first dropline relative to the first sidewall and the front wall;

flipping the tool so that the top face of the platform is positioned on the landing floor at the ledge of the doorway, and so that the first, second and third members of the tool are within the hoistway and the lip segment of the platform is against the front wall of the hoistway; and adjusting of the sliders, the position of the second member against the third member, and the first member relative to the platform, to measure the position of the another dropline relative to the second sidewall and the front wall.

* * * * *